G. W. MILTIMORE.
Car-Wheels.

No. 151,543. Patented June 2, 1874.

Witnesses:
G. Mathys
Solon C. Kemon

Inventor:
George W. Miltimore
Per

UNITED STATES PATENT OFFICE.

GEORGE W. MILTIMORE, OF JANESVILLE, WISCONSIN.

IMPROVEMENT IN CAR-WHEELS.

Specification forming part of Letters Patent No. 151,543, dated June 2, 1874; application filed December 15, 1873.

*To all whom it may concern:*

Be it known that I, GEORGE W. MILTIMORE, of Janesville, in the county of Rock and State of Wisconsin, have invented a new and Improved Railway-Car Wheel; and I do hereby declare that the following is a full, clear, and exact description of the same, reference being had to the accompanying drawing forming a part of this specification, in which—

Figure 1:
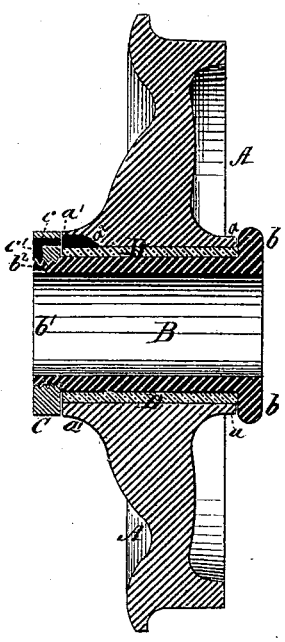
Figure 3:
Figure 2:
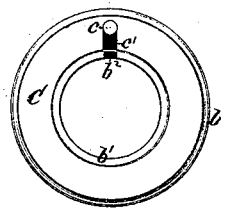

Figure 1 is a central vertical cross-section. Fig. 2 is an end view of nut and bushing. Fig. 3 is a detail view.

The invention relates to wheels generally, but mainly car-wheels; and consists in means for taking up the shock thereon, and of locking the bushing or journal box and its collar to the hub of wheel, as hereinafter described, and subsequently pointed out in the claims.

A represents a car-wheel preferably made to turn on and not with the axle. B is a tubular bushing or journal-box, (corresponding, as regards its inside shape and size, with the journal of axle,) with a flange, $b$, that fits against the outside end $a$ of wheel-hub, and with a nut, C, that screws against the other end $a^1$ of wheel-hub, and on the inwardly-projecting threaded end $b^1$ of bushing B. Between the tubular bushing B and the inside of hub is located a rubber ring, D, that takes up the shock with great efficiency, while it may be readily applied or removed.

In order to prevent the possibility of rotation in the bushing and nut independently of the wheel, I make a perforation, $c$, transversely through the nut, and at right angles thereto a groove, $c'$, through the former of which passes arm $e$, and in the latter of which lies the arm $e'$ of the right-angled key E'. In the bushing is a slot, $b^2$, that receives arm $e'$, while in the hub is an aperture, $a^2$, that receives the arm $e$. The latter aperture or slot is elongated to allow of the approximation of the bushing and hub when the rubber ring is compressed by a shock. As the arm $e'$ is in the open slot of that face of the nut that fits against the shoulder of axle the key E cannot come out unless the wheel is removed from the journal.

Having thus described my invention, what I claim as new, and desire to secure by Letters Patent, is—

1. The combination, with elastic ring D, of bushing B, having the flange $b$ and detachable nut C on opposite ends, and the hub A having ends $a$ $a^1$ fitting against said nuts and flange, as and for the purpose specified.

2. The key E, having two arms, $e$ $e'$, combined with nut C $c$ $c'$, bushing B $b^2$, and hub having slot $a^2$, as and for the purpose specified.

GEO. W. MILTIMORE.

Witnesses:
CHAS. A. PETTIT,
SOLON C. KEMON.